(12) United States Patent
Kassouf et al.

(10) Patent No.: US 12,013,953 B2
(45) Date of Patent: Jun. 18, 2024

(54) PERFORMANCE STANDBY NODES FOR A SECURE STORAGE SYSTEM

(71) Applicant: HashiCorp, San Francisco, CA (US)

(72) Inventors: Brian Kassouf, San Francisco, CA (US); Jeff Mitchell, Boston, MA (US); Armon Dadgar, Seattle, WA (US)

(73) Assignee: HashiCorp, San Francisco, CA (US)

( * ) Notice: Subject to any disclaimer, the term of this patent is extended or adjusted under 35 U.S.C. 154(b) by 199 days.

(21) Appl. No.: 16/846,229

(22) Filed: Apr. 10, 2020

(65) Prior Publication Data

US 2021/0319115 A1    Oct. 14, 2021

(51) Int. Cl.
   *G06F 21/60* (2013.01)
   *G06F 16/22* (2019.01)
   *H04L 9/08* (2006.01)

(52) U.S. Cl.
   CPC ........ *G06F 21/602* (2013.01); *G06F 16/2246* (2019.01); *H04L 9/0894* (2013.01)

(58) Field of Classification Search
   CPC ... G06F 21/602; G06F 16/2246; H04L 9/0894
   USPC ....................................................... 713/153
   See application file for complete search history.

(56) References Cited

U.S. PATENT DOCUMENTS

| | | | |
|---|---|---|---|
| 11,036,643 B1* | 6/2021 | Asher | G06F 12/0811 |
| 2017/0364698 A1* | 12/2017 | Goldfarb | G06F 16/9024 |
| 2020/0366478 A1* | 11/2020 | Mestery | H04L 12/4633 |
| 2021/0281578 A1* | 9/2021 | Olson | H04L 63/20 |

* cited by examiner

*Primary Examiner* — Kambiz Zand
*Assistant Examiner* — Phuc Pham
(74) *Attorney, Agent, or Firm* — FisherBroyles LLP; James P. Cleary

(57) ABSTRACT

Special performance standby nodes for data storage in a cloud computing security system are disclosed. Performance standby nodes are standby nodes that are configured to service requests that do not modify the underlying data store. These pseudo read-replica nodes are further configured to forward any request that results in a storage write onto an active node, while being able to service read-only requests locally.

8 Claims, 7 Drawing Sheets

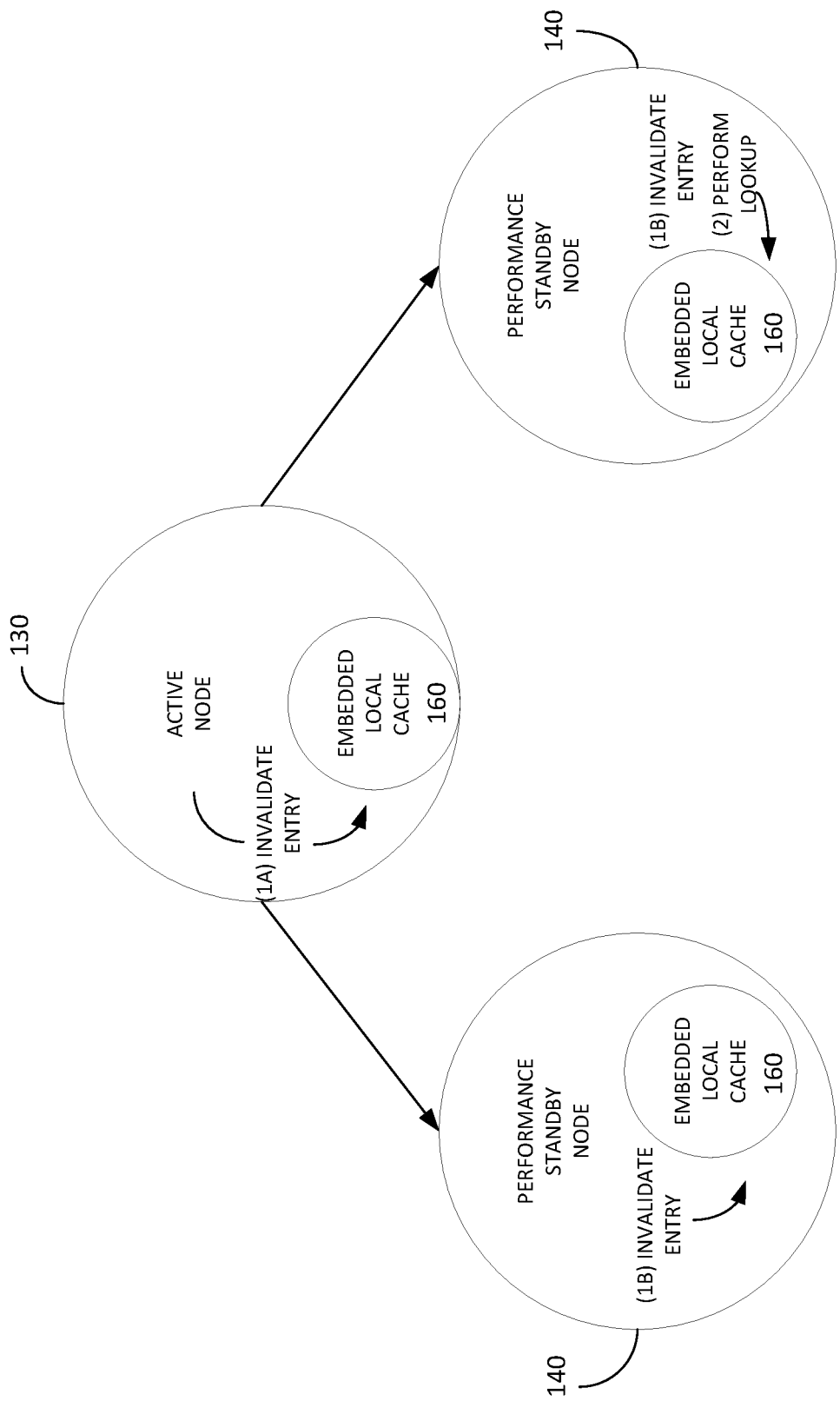

PERFORMANCE STANDBY NODES FOR A SECURE STORAGE SYSTEM

TECHNICAL FIELD

The subject matter described herein relates to data security and management in a cloud computing platform, and more particularly to performance standby nodes of a secure storage system to allow scaling of security and encryption operations in the cloud computing platform.

BACKGROUND

The transition to cloud, and multi-cloud, computing environments is a generational transition for information technology (IT). This transition means shifting from largely dedicated servers in a private datacenter to a pool of computing capacity available on demand. While most enterprises begin with one cloud computing provider, there are good reasons to use services from other cloud computing services, and inevitably most organizations will use more than one cloud computing platform, either by design or through mergers and acquisitions.

The essential implication of this transition to the cloud or multi-cloud is a shift from "static" infrastructure to "dynamic" infrastructure: from a focus on configuration and management of a static fleet of IT resources, to provisioning, securing, connecting, and running dynamic IT resources on demand. However, such a dynamic infrastructure can be characterized by low-trust networks in public clouds, an unknown network perimeter across clouds, and security primarily enforced by identity.

In particular, the security layer of a cloud computing infrastructure, for example, transitions from a fundamentally "high-trust" world enforced by a strong perimeter and firewall, to a "low-trust" or "zero-trust" environment with no clear or static perimeter. As a result, the foundational assumption for security shifts from being internet protocol (IP)-based, to using identity-based access to resources such as encrypted information. This shift has been highly disruptive to traditional security models. To address this shift, a set of shared security services have been developed for deployment to one or more servers within a cloud computing infrastructure. These servers are referred to herein as "security servers," each being a server computer, a part of a server computer, and/or the server code that executes the shared security services, or one or more instances thereof, on information that is used by or stored within the cloud computing infrastructure. These security services can include secrets protection and data management, such as, without limitation, user credentialing and authentication, information access control by users using client computers, and information encryption and encrypted storage in a shared data store.

Some cloud computing security services perform shared security services in a high availability (HA) mode. An HA mode protects against outages and/or failures within a cloud computing infrastructure by running multiple security servers. The HA mode can be automatically enabled when a data store, used by the multiple security servers to store information, is specifically configured to support the HA mode. For example, when a data store enables HA mode, one of the security server nodes can be configured to retrieve a data lock within the data store, thereby allowing that security server node to be designated and operated as an "active node" to modify the data associated with the lock, while all other nodes are designated as "standby nodes." At this point, if one of the standby nodes receive a request from a client of the cloud computing infrastructure, that standby node will either itself forward the request to the active node or redirect the client to the active node, depending on the current security service configuration.

In HA mode, standby nodes are available to take over active duty in the event of an outage or failure related to the active node. Despite HA standby nodes having access to the same underlying data store as the active node, they conventionally do not service any requests. Rather, they either reject or forward all requests onto the active node. This means all requests must be serviced by the active node, and scalability to handle larger numbers of requests is limited.

Standby nodes may not service requests for a number of reasons. First, allowing standby nodes to write to the underlying data store can cause data inconsistency, as requests to modify data in the data store received by the active node and standby nodes can sometimes conflict with each other. Additionally, standby nodes are unable to service read requests because there is no mechanism to update data structures cached in the memory of the standby node and that have been updated in the underlying data store, resulting in the standby node becoming out of sync with the underlying data store.

These issues with a single security service active node supporting an HA mode can constrain an ability of an enterprise to scale. This can be particularly true with encryption as a service (EaaS) requirements, which can vary widely depending on how many clients are providing encryption requests at any given time, such as read requests for encrypted data from the data store. Accordingly, there is a need for a cloud computing security system that can improve scale of security operations in an HA mode.

SUMMARY

This document describes special performance standby nodes for data storage in a cloud computing security system. Performance standby nodes are standby nodes that are configured to service requests that do not modify the underlying data store. These pseudo read-replica nodes are further configured to forward any request that results in a storage write onto an active node, while being able to service read-only requests locally.

In some aspects, a security system for a cloud computing platform includes a number of security service nodes, each of which has at least one data processor that is configured to provide security services on information. One of the security service nodes is designated in a startup phase of the security system as an active node to execute the security services, and one or more other security service nodes are designated as standby nodes. The security system further includes one or more performance standby nodes designated from the standby nodes. The performance standby nodes are configured to execute the security services only in response to read-only requests that do not modify the information, where each designated one or more performance standby nodes are further configured to forward to the active node any requests that modify the information. Each of the one or more performance standby nodes has an embedded cache that stores one or more cache objects related to the security services provided by the one or more performance standby nodes, at least some of the cache objects being invalidated by a write-ahead log (WAL) stream received by the one or more performance standby nodes from the active node.

In other aspects, a method of executing security services by a security system of a cloud computing platform is disclosed. The method includes the steps of designating, in a startup phase of the security system, an active node from a plurality of security service nodes of the security system, each of the plurality of security service nodes having at least one data processor that is configured to provide the security services on information in response to requests, and the designated active node is configured to execute the security services. The method further includes the steps of designating all other nodes of the plurality of security service nodes as standby nodes, and designating, from the standby nodes, one or more performance standby nodes to execute the security services only in response to read-only requests that do not modify the information, and to forward to the active node any requests that modify the information. Each of the one or more performance standby nodes includes an embedded cache of the cache layer for storing a number of cache objects related to the security services provided by the plurality of security service nodes. The method further includes the step of invalidating at least some of the cache objects in the embedded cache by a write-ahead log (WAL) stream from the active node that executes the security service.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a cloud computing platform, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 illustrates an active node and performance standby nodes using embedded local caches, in accordance with implementations of the present subject matter.

When practical, similar reference numbers denote similar structures, features, or elements.

DETAILED DESCRIPTION

Figure 1A:
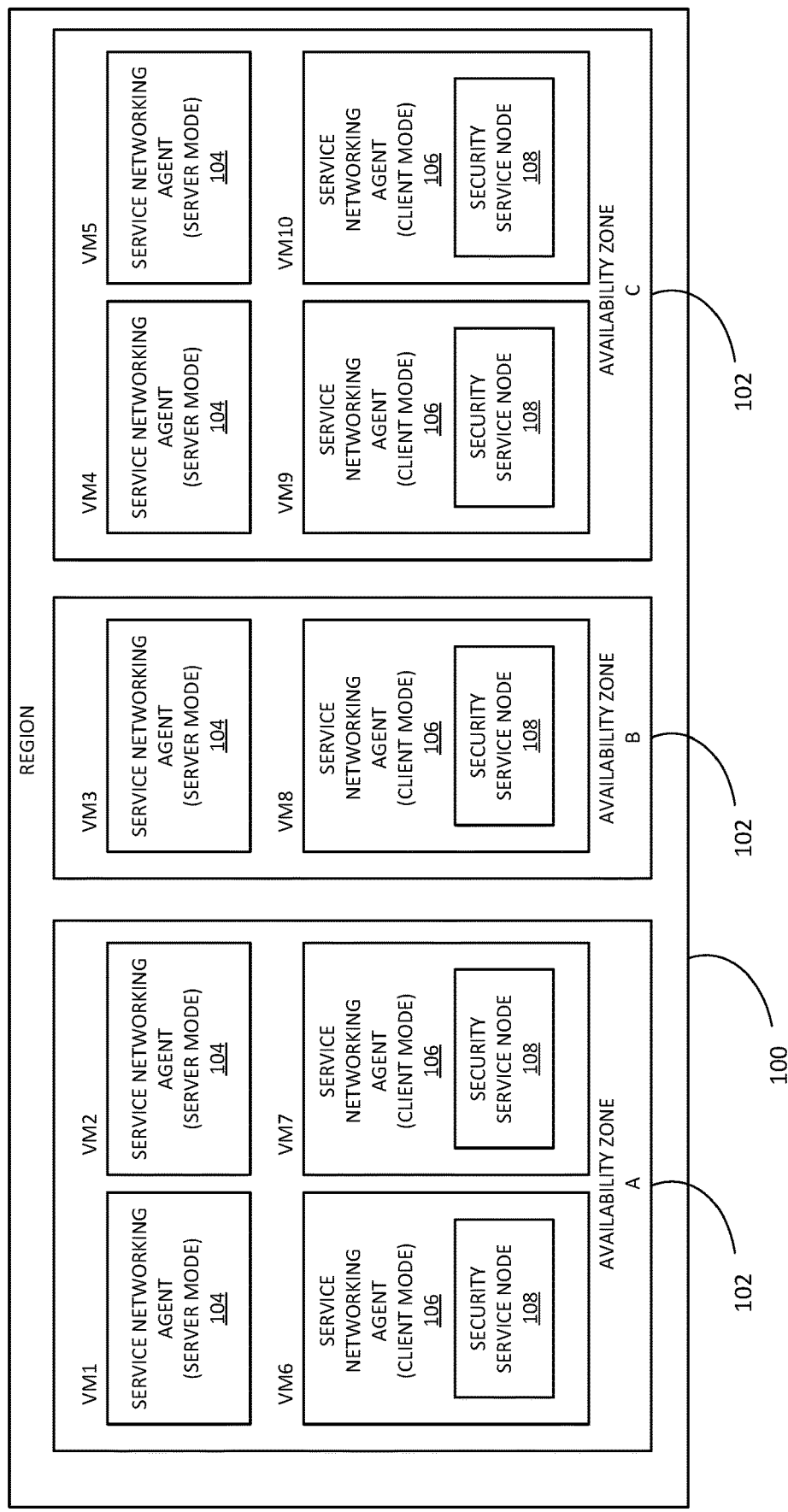
FIG. 1A shows a cloud computing infrastructure region with security service nodes of a security system.

FIG. 1A shows a cloud computing infrastructure formed as a region 100, which generally represents a physical location in which one or more data centers are clustered, and can define a geographical area within which cloud computing services are offered so as to minimize communications latency and to protect against faults, such as power outages, equipment failures, or the like. A data center represents one or more buildings, or a dedicated space within a building, that houses computer systems and associated components, such as information technology systems like servers, telecommunications equipment, and the like, many of which provide redundant services in the case of a failure, for high availability (HA).

Each region 100 includes one or more availability zones 102, which in turn define a group of logical data centers. Typically, each region 100 consists of multiple, isolated, and physically separate availability zones 102 within a geographic area to provide cloud computing services to geographically-adjacent enterprises or groups (designated Availability Zone A, Availability Zone B, and Availability Zone C in FIG. 1A). The region 100 and its associated availability zones 102 form a cloud computing architecture to minimize latency and provide a security domain, such as protection against failures related to power supply, data communications connections, environmental controls, and various data security mechanisms. Each region 100 can include its own data storage, such as a database or in-memory storage, a data cache, or the like.

Each availability zone 102 includes one or more service networking agents 104, 106, in a server mode or client mode, respectively, each of which can be instantiated by a virtual machine (designated as VM1, VM2 . . . VM10), but which can also be implemented as a standalone physical computing device. The service networking agents 104, 106 are configured to connect and secure services across any runtime platform and public or private cloud infrastructure, and to discover services and secure network traffic within the cloud infrastructure. Each service networking agent 104, 106 maintains membership information of users and/or groups of the cloud infrastructure, registers services, runs checks in order to connect various services or nodes, responds to queries, and more. Clusters of service networking agents 104, 106 can be provisioned on any infrastructure, can connect to services over transport layer security (TLS) via proxy integrations, and can serve TLS certificates with pluggable Certificate Authorities (CAs). These and other functions enable connection and communication among various applications and services of the cloud infrastructure.

As described above, each agent may run in one of two modes: server mode (server node 104) or client mode (client node 106). A server node 104 takes on responsibility of being part of a consensus quorum for use of cloud services within each availability zone 102 and the region 100, and provide strong consistency and availability of services in the case of failure in any part of the region 100. Accordingly, server nodes 104 are run on dedicated instances, and as such they are more resource-intensive than a client node 106. Client nodes 106 make up the majority of the cluster, and they interface with the server nodes 104 for most operations, and maintain very little state of their own.

In accordance with implementations described herein, each availability zone 102 of the region 100 of the cloud computing infrastructure includes a security system formed of a number of security service nodes 108. Each security service node 108 can be a server, a server process, or other logic thread(s), that executes processes to provide secrets protection and data management for information and data within each of the cloud computing platforms availability zones 102 of the region 100.

For instance, secrets protection can include systems, processes, and functions to centrally store, access, and distribute identity-based access secrets such as usernames and passwords, API keys, AWS IAM/STS credentials, SQL/NoSQL database credentials, X.509 certificates, secure shell (SSH) credentials, encryption keys, and the like. Data management includes systems, processes and functions to keep application data secure with centralized encryption key management, as well as simple APIs for data encryption, decryption, or the like.

Figure 1B:
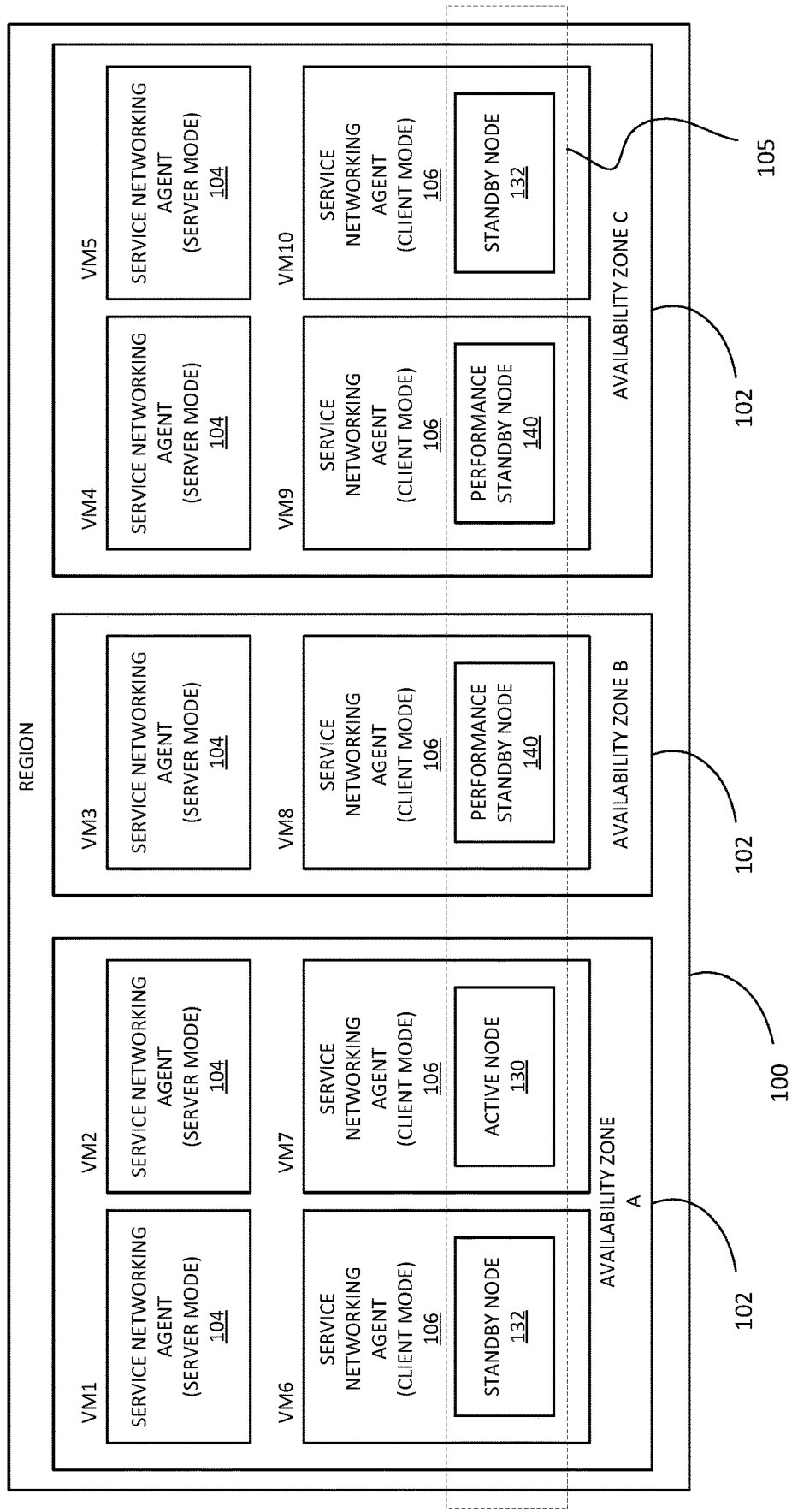
FIG. 1B shows the cloud computing infrastructure region with a designated active node and performance standby nodes for a high-availability operation.
Figure 2:
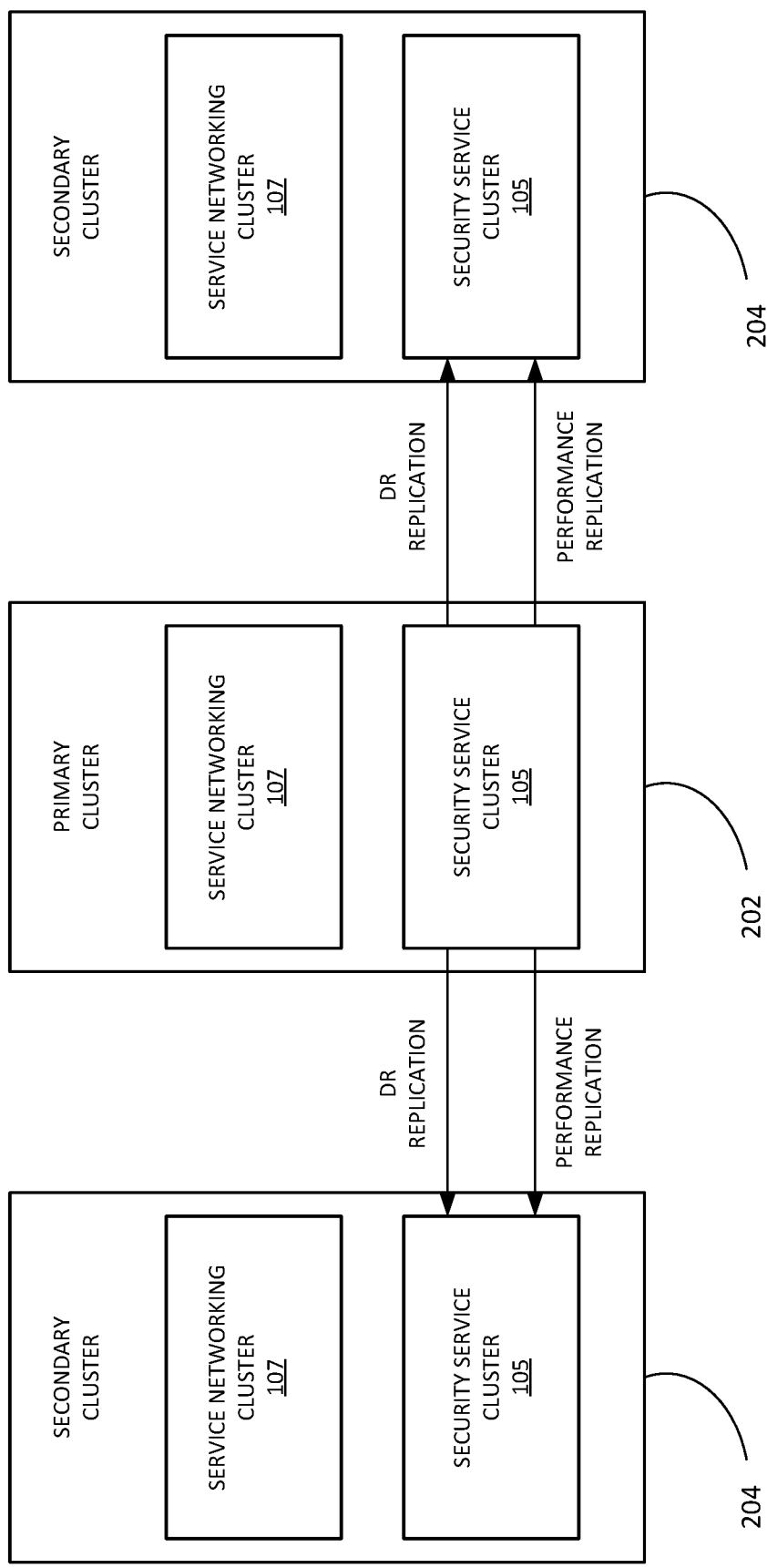
FIG. 2 shows a multi-region cloud computing infrastructure with designated primary and secondary networking and security clusters.

The service networking agents provided by server nodes and/or client nodes 104, 106 can define a service networking agent cluster, and which can be used as a storage backend for the security service nodes 108. Likewise, the collection of security service nodes within a region 100 can define a security cluster 105, as shown in FIG. 1B. The security cluster 105 is a set of security server processes that together run a security service. These security server processes can be run on physical or virtual servers, or in data containers. Functions of the security cluster 105 are further described below.

In accordance with some implementations, the cloud computing infrastructure 100 can be configured for running in an improved high-availability (HA) mode with improved performance over a conventional HA mode. In the improved HA mode, and as illustrated in FIG. 1B, one of the security service nodes 108 is designated and configured as an active node 130, and the remaining security nodes are designated and configured as standby nodes 132. In accordance with the subject matter described herein, at least some of the standby nodes can be configured as performance standby nodes 140 to service requests that do not modify the underlying data store, which can include data stored in caches or databases associated with each availability zone 102 or region 100. Performance standby nodes 140 are configured to work when in the same region 100 as an active node 130, and replication services can still exist between different clusters of the cloud computing infrastructure, as described below.

As pseudo read-replica nodes, the performance standby nodes 140 are configured to forward any request to the active node 130 that would result in a write onto data in the underlying data store, while servicing read-only requests locally. This is particularly useful for cryptographic functions on data in-transit, and key/value requests. Requests to other backend systems or components, such as services that create tokens or leases representing access to time-bounded secrets, are forwarded to the active node 130. Tokens are used for authentication of requests and other communication within the region 100. However, in accordance with some implementations, requests to create cryptographically-secured type tokens do not need to be forwarded to the active node 130, as they do not require modifying the underlying data store and can be handled by the performance standby node(s) 140.

Performance standby nodes 140 can be configured to receive and process a stream of Write-Ahead-Logs (WAL), which indicate changes to data in the data store by the active node 130 and which can also be used to maintain consistency in the cache layer of the security system while servicing the read-only requests. When a WAL stream is sent from the active node 130 to each performance standby node 140, a storage key associated with the WAL is cleared from the performance standby node's 140 in-memory caches and associated data structures so that data consistency is maintained. Because all nodes in the security cluster 105 use the same underlying data store, a cryptographic hash tree such as a Merkle Tree or the like is not needed. If a gap in the WAL stream is detected by a performance standby node 140, i.e. one of the logs of the WAL stream is out of sequence, the performance standby node 140 is configured to reinitiate itself to reset all in-memory data structures to be synchronized with the active node 130.

To minimize setup, if the active node 130 uses an HA-enabled data store, the server components can be running and ready to automatically start serving WAL streams to performance standby nodes 140. This information is typically used by each performance standby node 140 to connect to the active node 130 to start a WAL stream, so that the setup of performance standby nodes 140 is automated. In some implementations, performance standby nodes 140 are tagged as such in a service registry and discovery service of the cloud computing infrastructure. Authentication methods of the performance standby nodes 140 includes one or more unauthenticated login endpoints. These login endpoints can be reached by a service networking agent of server nodes 104 and client nodes 106 without any authentication, and are used for authentication to the security service. These login endpoints are specific to each authentication method.

In some implementations, a number of performance standby nodes 140 within a region 100 can be limited, to optimize the HA mode. Therefore, when a standby node 132 connects to the active node 130, it is sent instructions as to whether it should start as a performance standby node 140 as described above, or as a normal standby node 132 that does not service requests. When all the available performance standby node 140 are designated, to-be-designated standby nodes will run as normal HA standby nodes 132 and forward all requests to the active node 130. A replication server can be used to determine if a performance standby node 140 disconnects, and if it detects that an existing performance standby 140 is disconnected from the cluster 105, the replication server communicates this to the active node 130 which will promote a different standby node 132 to a performance standby node 140.

The service networking cluster 107 and security service cluster 105 of each region 100 allows for a failure domain at the node level by having replication within the cluster. In a single security service cluster 105, all nodes share the same underlying storage backend and therefore share the same data. This is achieved by one of the security service servers obtaining a lock within the data store to become the active node 130 and having write access. If at any time the active node 130 is lost, then another security service node 108 will seamlessly take its place as the active node 130.

Many organizations have cloud infrastructure that spans multiple datacenters and regions 100. The security cluster 105 provides the critical services of identity management, secrets storage, and policy management across multiple regions 100, and which can scale as the number of clients and their functional needs increase. At the same time, operators would like to ensure that a common set of policies are enforced globally across their enterprise, and that a consistent set of secrets and keys are exposed to applications that need to interoperate effectively. Accordingly, replication is provided to address both of these needs in providing consistency, scalability, and highly-available disaster recovery.

Replication operates on a leader/follower model, wherein a leader cluster, called a primary cluster 202, is linked to a series of follower secondary clusters 204. The primary cluster 202 acts as the system of record and asynchronously replicates most secrets data. All communication between the primary cluster 202 and the secondary clusters 204 is end-to-end encrypted with mutually-authenticated TLS sessions, setup via replication tokens.

What data is replicated between the primary cluster 202 and secondary clusters 204 depends on the type of replication that is configured between the primary cluster 202 and each secondary cluster 204. These types of relationships are configured either disaster recovery or performance relationships. In performance replication, one or more secondary clusters 204, as selected by the primary cluster 202, keep track of their own tokens and leases but share the underlying configuration, policies, and supporting secrets. If a user action via a client would modify underlying shared state, the secondary cluster 204 forwards the request to the primary cluster 202 to be handled, and this is transparent to the client.

In disaster recovery (DR) replication, one or more secondary clusters 204 share the same underlying configuration, policy, and supporting secrets infrastructure (K/V values, encryption keys for transit, etc.) as the primary cluster 202. The secondary clusters 204 also share the same token and lease infrastructure as the primary cluster 202, as they are designed to allow for continuous operations with applications connecting to the original primary cluster 202 on the election of the DR secondary cluster 204. DR is designed to be a mechanism to protect against catastrophic failure of entire clusters. Secondary clusters 204 do not forward service read or write requests until they are elected and become a new designated primary cluster 202.

Figure 3:
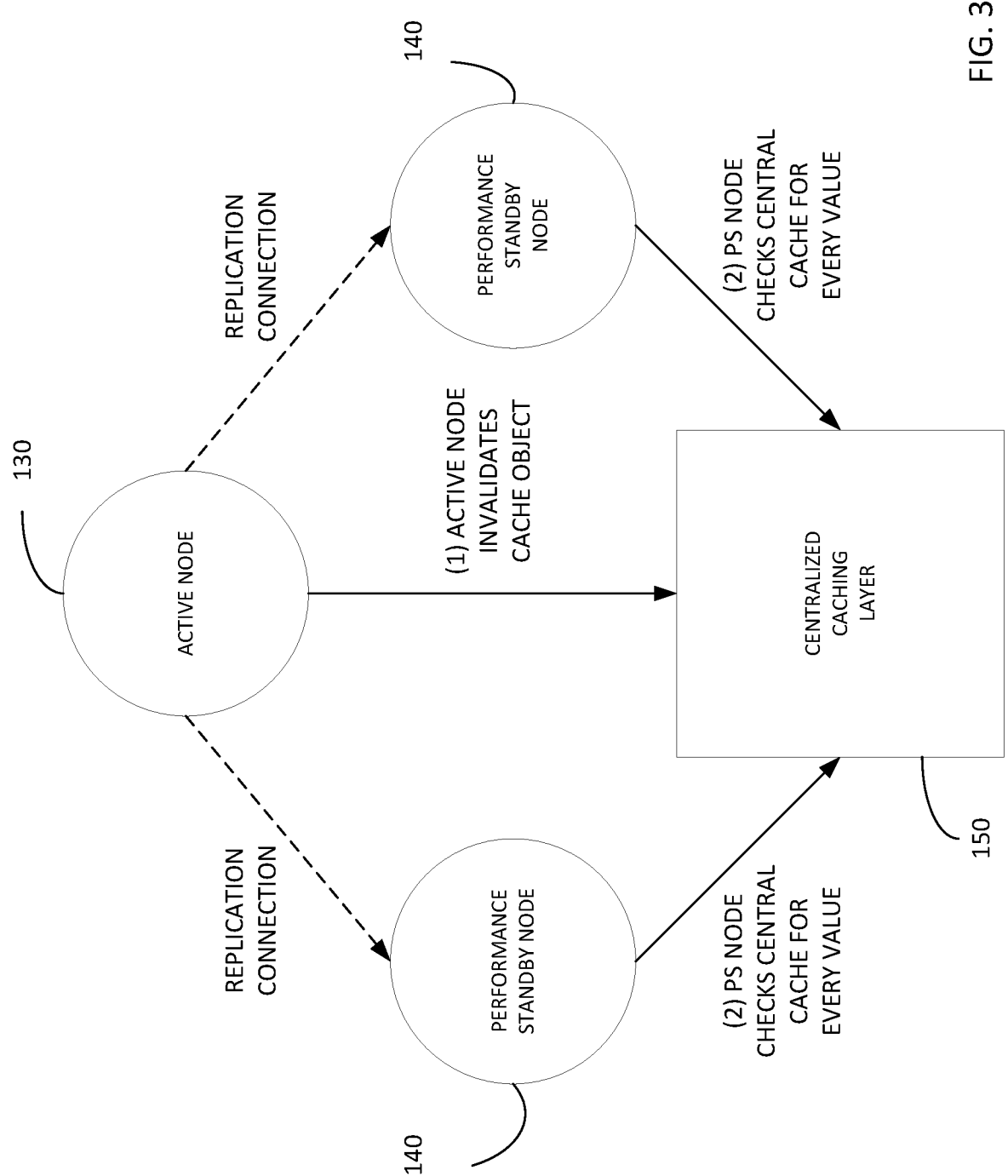
FIG. 3 illustrates performance standby nodes using a centralized caching layer that creates a single point of failure with significant decreased speed if it fails.
Figure 4:
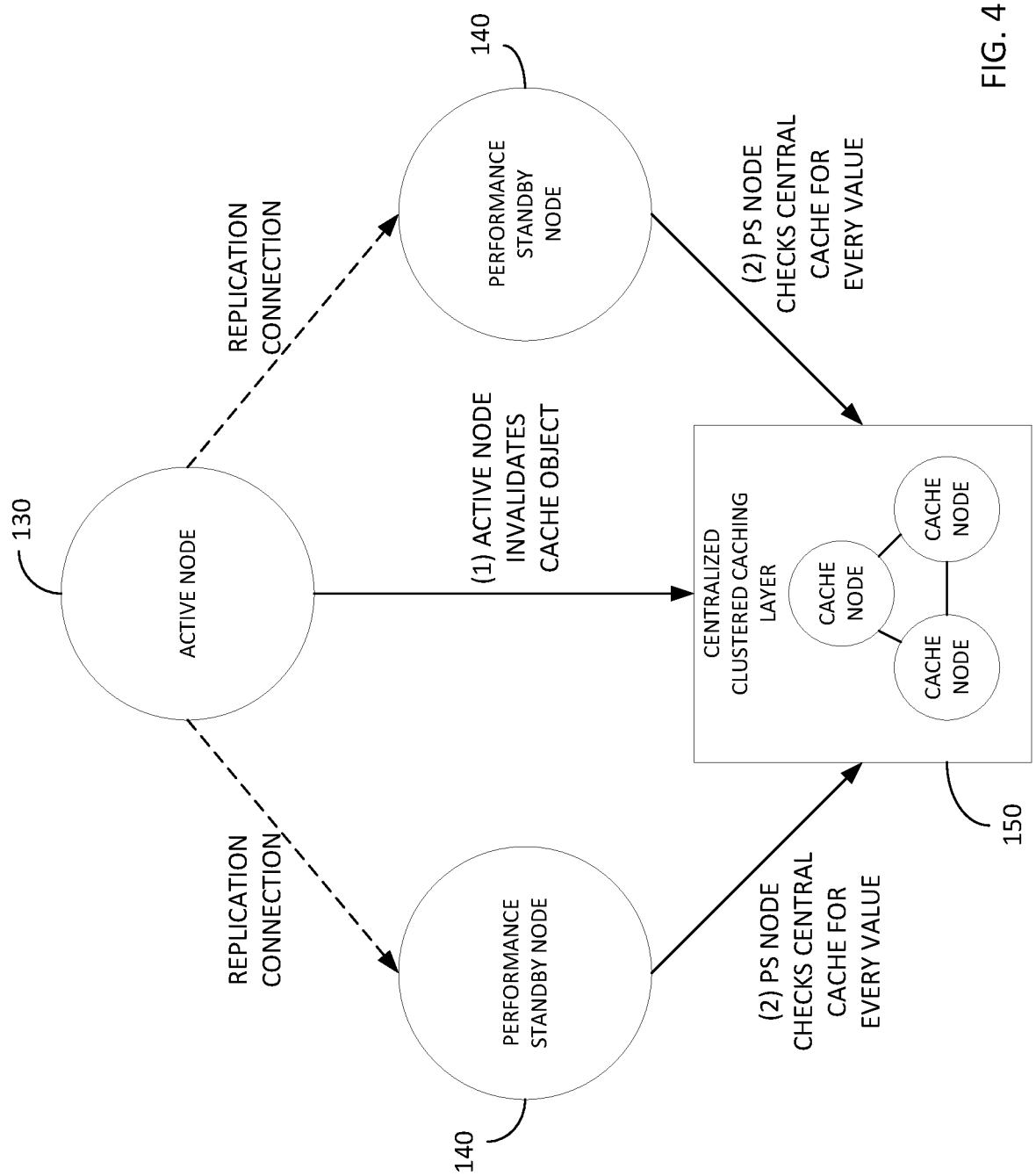
FIG. 4 illustrates performance standby nodes using a centralized clustered caching layer.

FIG. 3 illustrates a security service cluster having an active node 130 and one or more performance standby nodes 140 each using a centralized caching layer 150. FIG. 4 illustrates a security service cluster having an active node 130 and one or more performance standby nodes 140 using a centralized clustered caching layer 150 but with a number of separate cache nodes. When the active node 130 invalidates a cache object, i.e. authenticates or updates information in the cache object, each performance standby node 140 will check the centralized caching layer 150 for every value associated with the invalidation function. However, this can create a single point of failure with significant decreased speed if the caching layer fails, and requires an authentication state of the cache object to be managed.

Figure 5:
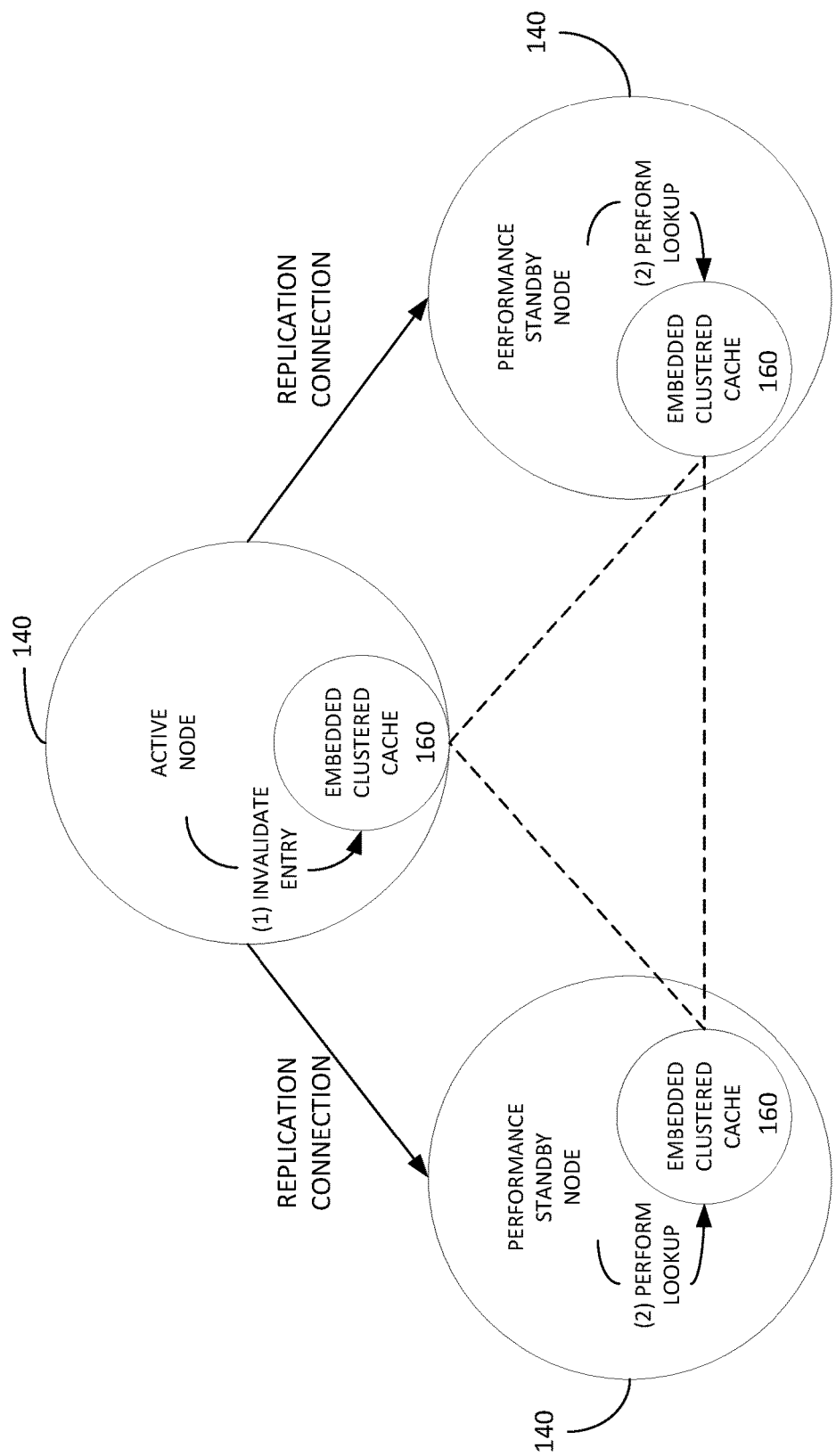
FIG. 5 illustrates performance standby nodes using an embedded clustered caching layer that operationalizes a separate service.

FIG. 5 illustrates a security service cluster having an active node 130 and one or more performance standby nodes 140, each of which use an embedded clustered caching layer 160 that operationalizes a separate service—the active node 130 invalidates a cache object in its associated embedded clustered caching layer 160, i.e. authenticates or updates information in the cache object, and each performance standby node 140 will check its associated embedded clustered caching layer 160 for every value associated with the invalidation function. As the embedded clustered caching layer 160 of each node shares the same underlying data store, the performance standby nodes 140 can automatically discover authentication/authorization information to enable these functions.

FIG. 6 illustrates a security service cluster having an active node 130 and one or more performance standby nodes 140, each of which use an independent and embedded local caching layer 160, where when the active node 130 invalidates a cache object in its associated embedded local caching layer 160, i.e. authenticates or updates information in the cache object, each performance standby node 140 will first invalidate the cache object in its associated embedded local caching layer 160, and then perform a lookup its associated embedded local caching layer 160 for every value associated with the invalidation function to ensure consistency across the cluster for the operation.

Standby nodes, whether normal standby nodes or performance standby nodes 140, do not need to run all the replication subsystems, such as a log shipper, Merkle tree generation, or a WAL backend. Remote Procedure Calls (RPC), replication finite state machines (FSM), WAL Stream, and replication invalidation mechanisms can be employed as follows.

RPC

Normal HA standby nodes 132 connect to the active node 130 via a transport layer security (TLS) client certificate that is retrieved from an encrypted storage of the cloud computing infrastructure 100. This TLS certificate can be used as an authentication mechanism by the standby nodes 132 to the active node 130. The replication services of the active node 130 can use this same TLS certificate for authentication to the replication server using an application-layer protocol negotiation (ALPN) name.

Additionally, in some implementations, an alternative process can be added to allow for a streaming remote procedure call (RPC). This streaming RPC can be used by the active node 130 to inform the normal standby node 132 that it will become a performance standby node 140. The active node 130 can also provide an authentication token to each performance standby node 140 to use in future RPC calls.

FSM

In some implementations, the FSM used by an active node 130 to manage WAL streams sent to performance standby nodes 140 needs two states: Streaming, and Stop. When a streaming error occurs, another stream by the FSM should be attempted with the starting location set to the last streamed WAL index. If an error is due to the active node 130 not being able to find the last known WAL index, then the FSM will be stopped to allow the security system to reinitialize itself, causing the state to be cleared and WAL streaming to resume.

WAL Stream

When a standby node 132 starts up or becomes operational, it will connect to the active node 130 and initiate receiving a WAL stream. Prior to entering performance mode, the standby node will query the active node 130 and get its hash tree root, such as of a Merkle tree. That hash tree root is then used to find the beginning of the WAL stream to allow changes to tokens and leases to also be sent to each standby node 132. Additionally, the WAL indexes sent from a DR log shipper are continuous and monotonically increasing, so it is simple to detect if any logs are missed. If a WAL entry is detected as missing, or the connection to the active node 130 is severed, the standby node 132 can request a WAL stream from the last known index. If the new WAL stream is irreconcilable with the last known index, then the standby node 132 can reinitialize and start from a fresh state based on the hash tree root.

In accordance with some implementations, the order of operations during the startup process includes: 1) fetch by the performance standby node(s) 140 the hash tree root from the active node 130; 2) start a WAL stream from the active node 130 based on the fetched root hash; and 3) request any WALs missed by any performance standby node(s) 140.

Invalidations

When a WAL entry is sent by an active node 130 to a performance standby node 140, the entry includes information about any encryption key or other key that has changed in the associated data. Services such as performance and/or DR replication utilize invalidations to not only clear any caches associated with security service nodes in the replicating security service clusters 105, but also to clear any other underlying data structures or memory associated with these nodes. Generic keys are updated or cleared in the cache, causing the security service cluster 105 to access the data store on a next read, as explained further below. Additionally the performance standby node(s) 140 can call an invalidation function implemented by backend services to ensure they delete any in-memory caches as well.

Read-Only Storage

In some implementations, a performance standby node 140 will mark the entire storage backend as "standby read-only" and forward to the active node 130 any request that attempts to do a write operation on the read-only storage.

Standby Leader Lock

During normal operation, each of the nodes are configured to continuously attempt to become the active node by being the first to obtain a lock from the backend storage or data store. When the lock is taken by a standby node, the standby node will need to halt operation and drain requests before becoming the active node. In some implementations, the standby node will first seal, and then reinitiate as an active node 130. The lock should not be given up during this process.

When a standby node 132 is promoted to become the new active node 130, the remaining standby nodes 132 retrieve information about the new active node 130 and reconnect their replication clients to the new active node 130. The new active node 130 will then select N of the standby nodes 132 to be promoted to performance mode as performance standby nodes 140, where N is defined by a license.

Values with Tracked State and Lifetimes

There are few special cases for some values with tracked states and lifetimes on the performance standby nodes 140. Since all revocations happen on the active node 130, there is no need to run a lifetime cycle manager process on performance standby nodes 140 to revoke such values. A lifetime cycle manager process on the active node 130 can be used to verify that a value is not expired.

If, when checking a request's value's validity or expiration a standby node determines that the token has a limited use count, the standby node can forward the request to the primary for handling. One caveat is that in the time between a token revocation on the active node 130 and a WAL log being processed on the standby node 132, the token will still be shown as valid in the standby node's 132 cache. This an acceptable risk since in-order processing of requests is not guaranteed in some implementations.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A security system for a cloud computing platform, the security system comprising:
   a plurality of security service nodes, each of the plurality of security service nodes having at least one data processor that is configured to provide security services on information, the security services comprising secrets protection and data management including user credentialing and authentication and information access control, and further comprising information encryption and encrypted storage in a shared data store, one of the plurality of security service nodes being designated and configured in a startup phase of the security system as an active node to execute the security services, and one or more other of the plurality of security service nodes being designated and configured as standby nodes; and
   one or more performance standby nodes designated from the standby nodes, the performance standby nodes being configured to execute the security services only in response to read-only requests that do not modify the information, the read-only requests comprising cryptographic key/value requests, each designated one or more performance standby nodes being further configured to forward to the active node any requests that modify the information, each of the one or more performance standby nodes having an embedded cache storing one or more cache objects related to the security services provided by the one or more performance standby nodes, at least some of the one or more cache objects being invalidated by a write-ahead log (WAL) stream received by the one or more performance standby nodes from the active node.

2. The system in accordance with claim 1, wherein the WAL stream is started based on a Merkle root read from the active node and unsealed in each of the one or more performance standby nodes, the Merkle root connecting the active node with each of the one or more performance standby nodes.

3. The system in accordance with claim 1, wherein the security services include indexing the secrets and/or and data by the active node using a Merkle tree.

4. The system in accordance with claim 1, wherein the plurality each of the one or more cache objects includes one or more of encryption keys, transport layer security certificates, security tokens and leases.

5. A method of executing security services by a security system of a cloud computing platform, the method comprising:
   designating, in a startup phase of the security system, an active node from a plurality of security service nodes of the security system, each of the plurality of security service nodes having at least one data processor that is configured to provide the security services on information in response to requests the designated active node configured to execute the security services, the security services comprising secrets protection and data management including user credentialing and authentication and information access control, and further comprising information encryption and encrypted storage in a shared data store;
   designating all other nodes of the plurality of security service nodes as standby nodes;
   designating, from the standby nodes, one or more performance standby nodes to execute the security services only in response to read-only requests that do not modify the information, the read-only requests comprising cryptographic key/value requests, and to forward to the active node any requests that modify the information, each of the one or more performance standby nodes having an embedded cache of the cache layer storing a plurality of cache objects related to the security services provided by the plurality of security service nodes; and
   invalidating at least some of the cache objects in the embedded cache by a write-ahead log (WAL) stream from the active node executing the security service.

6. The method in accordance with claim 5, wherein the WAL stream is started based on a Merkle root fetched from the active node and unsealed in each of the one or more performance standby nodes, the unsealed Merkle root connecting the active node with each of the one or more performance standby nodes.

7. The method in accordance with claim 5, wherein the security services include indexing the secrets and/or data by the active node using a Merkle tree.

8. The method in accordance with claim 5, wherein the plurality of cache objects includes one or more of encryption keys, transport layer security certificates, security tokens and leases.

* * * * *